W. E. HOLLAND.
BATTERY CELL.
APPLICATION FILED MAR. 15, 1915.
1,250,460.
Patented Dec. 18, 1917.
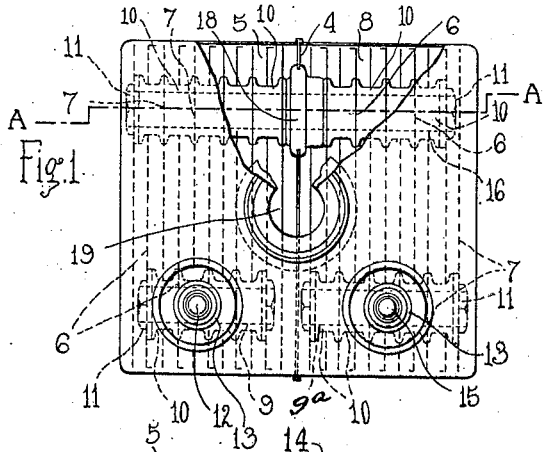
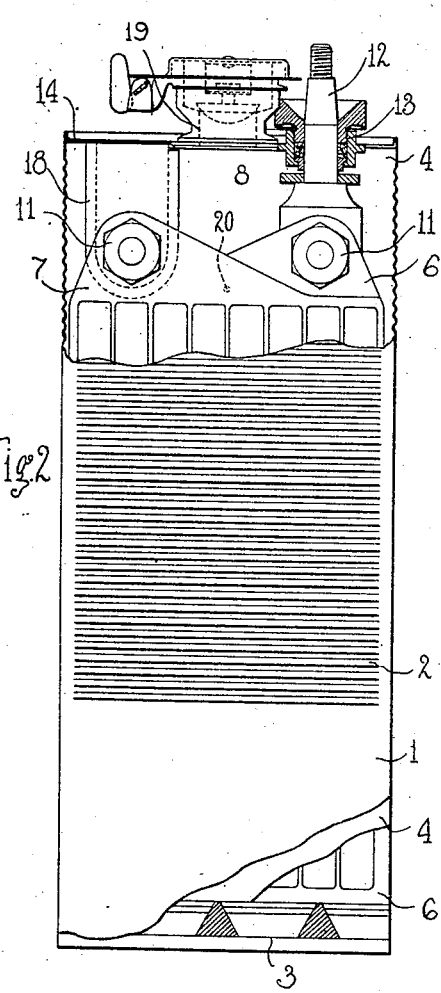
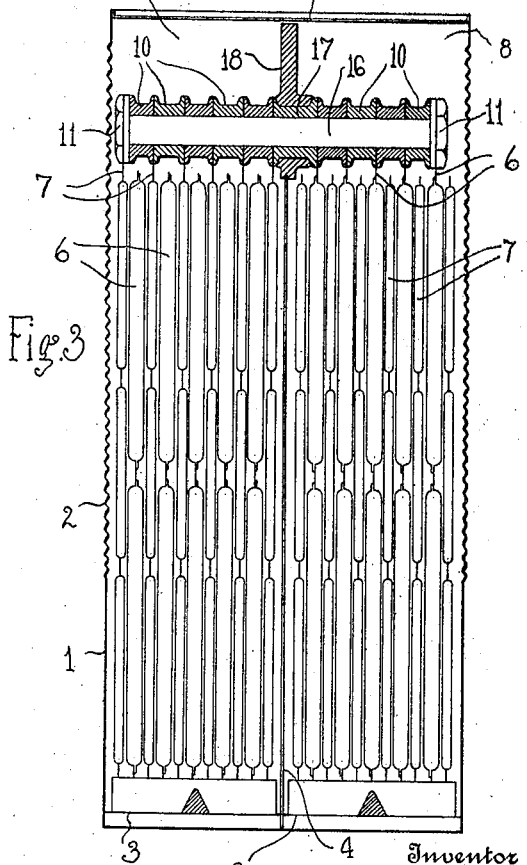
Inventor
Walter E. Holland
Witnesses
Chas. W. Stauffer
Karl H. Butler
By
Attorneys

UNITED STATES PATENT OFFICE.

WALTER E. HOLLAND, OF DETROIT, MICHIGAN.

BATTERY-CELL.

1,250,460.  Specification of Letters Patent.  Patented Dec. 18, 1917.

Application filed March 15, 1915. Serial No. 14,317.

*To all whom it may concern:*

Be it known that I, WALTER E. HOLLAND, a citizen of the United States of America, residing at Detroit, in the county of Wayne and State of Michigan, have invented certain new and useful Improvements in Battery-Cells, of which the following is a specification, reference being had therein to the accompanying drawings.

This invention relates generally to storage batteries, and more particularly to storage batteries of the Edison or alkaline type.

One of the objects of my invention is to provide a dual Edison cell wherein novel and effective means are employed for connecting two cells to simplify and cheapen the construction and to reduce electrical resistance due to usual connections.

Another object of this invention is to materially reduce the weight of a battery and to reduce the number of filling openings necessary for filling the cells with electrolyte or for adding water to the cell to replace evaporation.

A further object of this invention is to provide a dual cell as a unit that can be advantageously used to make up the storage batteries of electrically driven vehicles; the manner of assembling the cells into dual units insuring a compact structure that occupies considerably less space than the equivalent in the present type single cell units.

I attain the above and other objects by a mechanical construction that will be hereinafter specifically described and then claimed, and reference will be had to the drawing, wherein—

Figure 1 is a plan of the dual cell partly broken away;

Fig. 2 is a side elevation of the same partly broken away and partly in section, and Fig. 3 is a vertical cross sectional view of the cell taken on the line A—A of Fig. 1.

The reference numeral 1 denotes a container, preferably made of nickel plated steel and said container is rectangular in cross section and is provided with transverse corrugations 2 adapted to add rigidity to the walls of the container. The bottom of the container is preferably made of two pieces 3 autogenously welded to the lower edges of the container walls and a central partition 4 made of nickel plated steel and of less weight than the walls of the container. The partition 4 divides the container into cells or compartments 5 and 8 and in said compartments are arranged positive and negative plates generally designated 6 and 7. These plates are assembled so as to form a unitary structure and the positive plate may consist of a steel-nickel plated frame or grid containing perforated, nickel-plated steel tubes filled with alternate layers of nickel hydroxid and pure metallic nickel in thin flakes. The negative plate may consist of a nickel plated steel frame or grid having openings in which are contained pockets of finely perforated nickel plated steel filled with a chemically active finely divided iron or iron oxid mixture, such positive and negative plates being common to an Edison storage battery.

The positive plates in the cell 5 are mechanically and electrically secured together by means of rod 9 passing transversely through the upper apertured ends of said plates. Spacing collars or spools 10 are arranged upon the rod between the upper apertured ends of said plates and nuts 11 are screwed upon the ends of the rod to retain the parts assembled. This positive element 6 of the cell 5 has a terminal 12 extending through a stuffing box 13 provided therefor in a one piece cover 14 fixed in the top of the container in spaced relation to the upper edge of the partition 4.

The negative element 7 of the cell 8 is constructed similarly to the positive element 6 of the cell 5 and said negative element has a rod $9^a$ and a terminal 15.

The negative and positive elements 7 and 6 of the cells 5 and 8 respectively are similarly constructed, with the exception that a single rod 16 serves the same purpose as the rods 9 and $9^a$. The single rod 16 has a spacing sleeve 17 between the negative and positive elements 7 and 6 of the cells 5 and 8, and the spacing sleeve 17 is provided with a hard rubber insulator 18 as a complement of the partition 4, said insulator receiving the edges of the partition where cut away and extending to the cover 14 of the container.

The cover 14 of the container is provided with a capped filling opening 19 that is common to the cells 5 and 8, said opening being of sufficient size to facilitate inspection at both sides of the partition 4 and to allow of filling both cells. It is through this opening that electrolyte is placed in the cells, the electrolyte consisting preferably of a solution of potassium hydroxid in distilled water with a small percentage of lithia. To equalize the level of the electrolyte solution within the cells, the partition 4 has a small opening 20.

From the foregoing it will be observed that the arrangement of the cells in the dual container is such that it is unnecessary to provide a filling opening for each cell; furthermore that the arrangement is such as to provide a very compact cellular battery construction.

One embodiment of my invention has been illustrated, but it is to be understood that the structural elements are susceptible to such variations and modifications as fall within the scope of the appended claims.

What I claim is:—

1. A storage battery unit, comprising a container, a partition in said container providing dual compartments, and positive and negative elements in the compartments, with the negative element of one compartment and the positive element of the other compartment mechanically and electrically connected through said partition.

2. A storage battery unit, comprising a container, a partition in said container providing dual compartments, and positive and negative elements in the compartments, with the negative element of one compartment and the positive element of the other compartment mechanically and electrically connected.

3. A storage battery unit, comprising a container, a partition in said container providing dual compartments, and positive and negative elements in the compartments with the negative element of one compartment and the positive element of the other compartment mechanically and electrically connected, the remaining positive element of one compartment and the negative element of the other compartment each having mechanical and electrical connections with corresponding separate cell poles or terminals extending through the cover of the container.

4. A storage battery unit, comprising a container, a partition in said container providing dual compartments, said container having the top thereof provided with a filling opening common to both of said compartments, and positive and negative elements in the compartments with the negative element of one compartment and the positive element of the other compartment mechanically and electrically connected through said partition.

5. A storage battery unit comprising a container having compartments separated by a partition extending in proximity to the top of said container, and positive and negative elements in each compartment of said container and mechanically connected in each compartment independent of said partition and adjacent a wall of said container, and the elements of one compartment connected to the elements of the other compartment through the partition of said container adjacent another wall thereof.

In testimony whereof I affix my signature in presence of two witnesses.

WALTER E. HOLLAND.

Witnesses:
 ANNA M. DORR,
 CHAS. W. STAUFFIGER.